United States Patent
Reuthal

[19]

[11] Patent Number: 6,095,943
[45] Date of Patent: Aug. 1, 2000

[54] ARRANGEMENT FOR OPERATING A FRICTION CLUTCH

[75] Inventor: Rainer Reuthal, Unterpleichfeld, Germany

[73] Assignee: Mannesmann Sachs AG, Schweinfurt, Germany

[21] Appl. No.: 09/329,667

[22] Filed: Jun. 10, 1999

[30] Foreign Application Priority Data

May 6, 1999 [DE] Germany .......................... 199 20 803

[51] Int. Cl.$^7$ ................................................. B60K 41/02
[52] U.S. Cl. ............................................................ 477/86
[58] Field of Search ................................. 477/86, 174

[56] References Cited

U.S. PATENT DOCUMENTS

| | | | |
|---|---|---|---|
| 5,064,039 | 11/1991 | Otsuka et al. ............................ | 477/86 |
| 5,082,097 | 1/1992 | Goeckner et al. ........................ | 477/86 |

FOREIGN PATENT DOCUMENTS 27 48 697 A1   3/1979   Germany .......................... B60K 9/04

Primary Examiner—Dirk Wright
Attorney, Agent, or Firm—Cohen, Pontani, Lieberman & Pavane

[57] ABSTRACT

An arrangement for operating an automated friction clutch in a mechanical drive train of a motor vehicle driven by an internal combustion engine. A clutch operator actuator, by means of which a clutch operator of the clutch can be adjusted between at least one engaged position, in which the clutch is engaged at least partly for transmitting a torque, and a de-clutched position in which the clutch is completely de-clutched. An electronic control device controlling the clutch operator actuator. The electronic control device responds to a clutching requirement signaling device, which can be operated by an operator, and is designed for the purpose of supplying an engaging control signal which changes the position of the clutch operator from the de-clutched position to the engaged position to the clutch operator actuator in response to a clutching requirement signaled with the engine switched off and the clutch de-clutched. This makes it possible for the vehicle to be tow-started and towed away without the risk of damage to the drive train components.

9 Claims, 1 Drawing Sheet

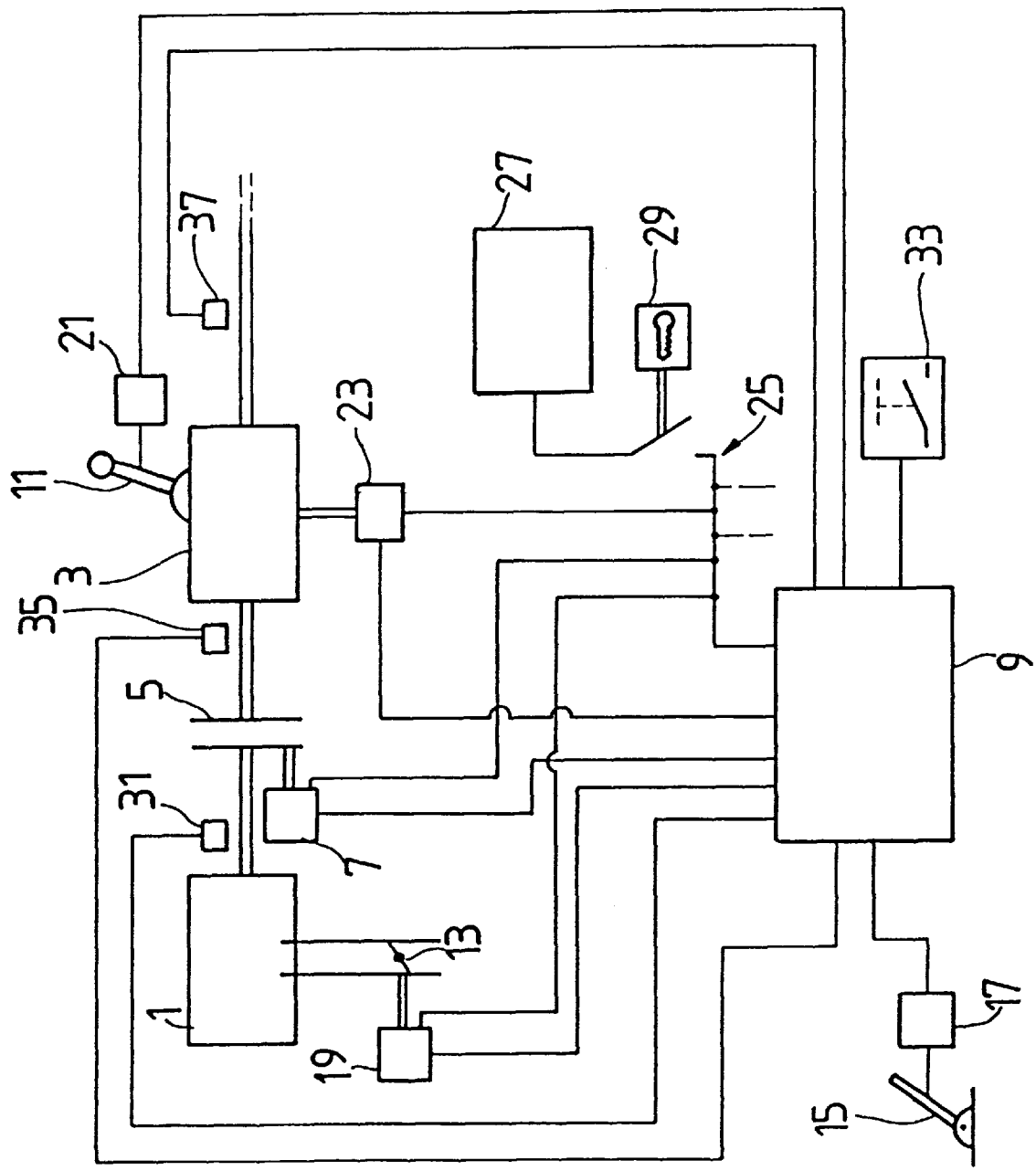

ARRANGEMENT FOR OPERATING A FRICTION CLUTCH

BACKGROUND OF THE INVENTION

1. Field of the Invention

The present invention relates to motor vehicles having a mechanical drive train, and internal combustion engine and an automated friction clutch, and more particularly, to tow-starting and towing away such a motor vehicle.

2. Description of the Related Art

It can sometimes happen that the vehicle cannot be started because of a functional failure of its starter motor. In a conventional vehicle with a foot-operated clutch, it is nevertheless possible for the engine to start if, with the vehicle rolling and a gear engaged, the clutch is engaged by the driver, thus producing a closed torque-transmitting path between the driven wheels of the vehicle and the internal combustion engine. In this case, in order to set the vehicle in motion, the driver can let the vehicle roll downhill without external aid, or have the vehicle pulled by another vehicle. Sometimes, the engine dies as the vehicle is being driven, for example during a gear change. In this case, as well, the driver can restart the engine by engaging the clutch if the vehicle has sufficient speed. The term "tow-starting" refers within the scope of the invention to all situations in which the rolling moment of the driven wheels of the vehicle is to be used to start the switched-off engine by closing the torque-transmitting path to the driven wheels. In this case, switched off means that the engine is not firing, which can be the case after the vehicle has been deliberately taken out of service, but also after the engine has inadvertently died.

After a breakdown or an accident, the vehicle is, however, occasionally not capable of being driven. There is then a need for external aid in order to tow it away. When the vehicle rolls on its driven wheels when being towed away, it is expedient to interrupt the transmission of torque between the driven wheels and the engine in order to avoid damaging the drive train components. This can be performed, for example, by putting the transmission into a neutral position in which no gear is engaged. However, it is sometimes not possible after an accident to put the transmission into its neutral position, for example when the vehicle remains with a gear engaged and the accident has caused damage to the gearbox. In such a case, with the clutch engaged there would be a risk of damaging the engine if the vehicle is towed away at a speed for which the gear transmission ratio set at the moment the gearbox was damaged is not designed and, consequently, the crankshaft of the engine is turned at an impermissibly high speed. In order to eliminate this risk, the driver would then have to release the clutch by treading on the clutch pedal.

In the case of vehicles with an automatic clutch, however, the driver generally has no clutch pedal available for influencing the clutch. If, with the engine switched off and a gear engaged, the vehicle is pulled by another vehicle, the electronic system of the vehicle which controls the clutch is generally unable per se to detect whether it is desired to tow-start the vehicle engine, or whether it is desired to tow the vehicle away (e.g., due to the damaged gearbox). It would be recommendable for safety reasons to release the clutch in order to reliably be able to prevent possible damage which could arise during towing away with the clutch engaged. Starting the internal combustion engine via the drive train would then, not be possible. On the other hand, if the clutch were to be held in its engaged position by the electronic control system, it will be possible to start the internal combustion engine, but in a tow-away situation it would not be possible to rule out damage to the drive train components.

SUMMARY OF THE INVENTION

It is therefore an object of the invention to provide a way in which it is possible for a motor vehicle designed with a mechanical drive train and with an automated clutch to carry out tow-starting and towing-away operations without the risk of damaging the drive train components.

In order to achieve this and other objects, the invention proceeds from an arrangement for operating a friction clutch in a mechanical drive train of a motor vehicle driven by an internal combustion engine, comprising a clutch operator actuator by means of which a clutch operator of the clutch can be adjusted between at least one engaged position, in which the clutch is engaged at least partly for transmitting a torque, and a de-clutched position in which the clutch is completely de-clutched, and an electronic control device, for controlling the clutch operator actuator.

In accordance with and embodiment of the invention, the control device responds to a clutching requirement signaling device, which can be operated by an operator, and is designed for the purpose of supplying to the clutch operator actuator an engaging control signal which causes the clutch operator to changes the clutch from the de-clutched position to the engaged position in response to a clutching requirement signaled with the engine switched off and clutch de-clutched.

The invention permits the operation of "tow-starting" to be prioritized with respect to the operation of "towing away" by active intervention of the driver. By operating the clutching requirement signaling device with the clutch declutched and engine switched off, the driver can indicate to the control device that it is desired to tow-start the vehicle and, to this end, the aim is to transfer the clutch into its engaged state. Because the driver is given the possibility of communicating to the control device his desire to engage the clutch, the control device can select the de-clutched state as a standard or basic setting for the clutch, at least in cases in which the vehicle is set in motion starting from standstill with the engine switched off and gear engaged. It is then possible for the vehicle to be towed away without a problem in these cases.

The clutching requirement signaling device can be implemented such that in order to signal the clutching requirement the driver must operate at least one operating member which also serves to control the driving operation of the vehicle with the engine running. For example, the control device can respond to a power-setting sensor which detects the position of an engine power setting device, in particular a gas pedal. The control device could then determine the clutching requirement as a function of the position of the engine power setting device. As an alternative or in addition, the control device responds to a lever-position sensor which detects the position of a selector lever for a gearbox, in particular an automatic one, connected downstream of the clutch in the drive train. The control device then determines the clutching requirement as a function of the position of the lever-position sensor. However, it is also conceivable that a separate operating member free of other functions is provided for signaling the clutching requirement. It goes without saying that in order to signal the clutching requirement, the driver can be required to operate various operating members, such an operation being performed simultaneously or in temporal sequence, and/or to operate at least one operating member several times.

Since the engine requires a certain minimum speed of its crankshaft in order to start up, it can be expedient if the control device is connected to a sensor system supplying information on the output speed of the clutch. With the engine switched off and the clutch de-clutched, the control device generates the engaging control signal only when the output speed exceeds a predetermined engaging speed threshold. It is possible to ensure such a high degree of reliability that the internal combustion engine will actually start up when the clutch is engaged.

If the engine dies inadvertently, for example during a gear shift, it can be desirable to immediately attempt to put the engine into gear again without the active intervention of the driver. In another embodiment of the invention, it is provided for this purpose that with the engine switched off and the clutch de-clutched, the control device generates the engaging control signal given the presence of at least one predetermined driving operating state of the vehicle, even without the clutching requirement being signaled by the operator.

It is expedient in the non-operating state of the vehicle if the clutch is closed with the gear engaged, because the vehicle is thereby ensured against inadvertently rolling away. If the vehicle, however, is to be set in motion starting from this state for the purpose of being tow-started or towed away, it is firstly necessary to open (disengage) the clutch. In order to provide the driver with the possibility of active engagement for this purpose, the control device is preferably further designed to supply to the clutch operator actuator with a de-clutching control signal which changes the position of the clutch operator from the engaged position to the de-clutched position in response to a clutching requirement signaled with the engine switched off and the clutch engaged. Thus, the driver can not only signal to the control device with a desire to engage, but also with a desire to de-clutch. In this case, the manipulations which are required of the driver on the clutching requirement signaling device can even be the same for signaling the desire to engage and for signaling a desire to de-clutch. Depending on whether the clutch operator is located in its engaged position or in its de-clutched position, the control device then interprets the clutching requirement as a desire to de-clutch or as a desire to engage. Of course, it is also possible for different types of manipulation of the clutching requirement signaling device to be required for the purpose of signaling a desire to engage and a desire to de-clutch.

It can happen that the driver forgets to signal his desire to de-clutch to the control device when the vehicle is to be set in motion with the engine switched off, the gear engaged and the clutch closed. A safety measure for preventing possible damage to the engine in this instance can then consist in that the control device is connected to a sensor system supplying information on the output speed of the clutch and, with the engine switched off and clutch engaged, when the output speed exceeds a predetermined de-clutching speed threshold the control device generates the de-clutching control signal, even without the clutching requirement being signaled by the operator.

This measure ensures that the clutch is automatically opened, starting from a predetermined vehicle speed which depends on the gear transmission ratio respectively set and is, for example, a few km/h, with the result that the driver need not intervene actively for the purpose of towing the vehicle away. If, by contrast, the vehicle is to be tow-started, the driver must subsequently intervene actively by informing the control device of his desire to engage by operating the clutching requirement signaling device. Thereupon, the control device causes the clutch previously opened as a function of speed to be closed again.

It goes without saying that the clutch need not be completely closed for the engine to start up. Rather, the clutch need be closed only to the extent that the engine towing torque required to start the engine is transmitted via the clutch.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is explained in more detailed below with the aid of the sole attached drawing:

The FIGURE is a schematic block diagram of an arrangement for operating an automatic motor vehicle friction clutch according to an embodiment of the invention.

DETAILED DESCRIPTION OF THE PRESENTLY PREFERRED EMBODIMENTS

The FIGURE shows a friction clutch 5 arranged between an internal combustion engine 1 and a gearbox 3 of a motor vehicle and which can be engaged and released by means of an actuator 7. The actuator 7, preferably constructed as a positioning drive, sets the clutch operator (not represented in more detail) of the clutch 5 at a position which is prescribed by an electronic control center 9. The control center 9 controls the actuator 7 not only as the vehicle is being driven during start-up and changing of the gears in the gearbox 3, but also when the engine 1 is operationally at a standstill for the purpose of tow-starting and towing the vehicle away. The gearbox 3 can be one which is manually operable or automatic. A selector lever 11 can be used to select a gear in the gearbox 3. The selector lever 11 call be guided in a shifting gate which provides a dedicated gate track for each gear in a conventional way. However, it can also be a selector lever which can only be tilted forward and backward and by means of which the gearbox 3 can be sequentially operated.

The power of the internal combustion engine 1 is controlled by a power-setting member 13, for example a throttle valve or an injection pump, by means of a gas pedal 15 whose deflection angle is detected by a gas pedal sensor 17. The gas pedal sensor 17 supplies its sensor signal to the control center 9 which, for its part, controls an actuator 19 of the power-setting member 13 with the engine 1 running as a function of the detected deflection angle of the gas pedal 15.

A lever-position sensor 21 detects the position of the selector lever 11 and supplies a corresponding sensor signal to the control center 9. Depending on the lever position of the selector lever 11, the control center 9 controls an actuator arrangement 23 of the gearbox 3. The gearbox 3, for its part, is mechanically connected on the output side (in a way not shown in more detail) to driven wheels of the vehicle via a differential gear.

The power requirement of the electric and electronic components of the vehicle is covered from the vehicle network, denoted in general by 25. With the engine 1 at a standstill, the vehicle network 25 is fed by a storage battery 27. The electric power supply of the electric and electronic components mentioned can be switched on via an ignition switch arrangement 29 coupled to the ignition key of the vehicle.

Tow-starting and towing away the vehicle are to be possible without the risk of damage to the drive train components. For this purpose, with the engine 1 at a standstill and the power supply switched on, (that is to say the ignition switch arrangement 29 closed), the driver of the vehicle can signal to the control center 9 a clutching requirement which the control center 9 converts into a corresponding position-setting signal which it sends to the actuator 7. The standstill of the engine 1 can be detected by means of an engine speed sensor 31 which detects the engine speed. Various possibilities are conceivable for signaling the clutching requirement with the engine 1 at a standstill and the power supply switched on. For example, the gas pedal 15 can be pressed down, in particular beyond a predetermined threshold angle of deflection. Alternatively or in addition, the selector lever 11 can be operated in a predetermined direction and/or be brought into a predetermined lever position. Alternatively or in addition, again, it is possible to provide a special clutching requirement signaling switch 33 which the driver can operate to signal his desire to operate the clutch. It is also possible to fix the time threshold in such a way that the respective operating member must be operated for a predetermined minimum period. It is possible in this way to neglect inadvertent short-term operations. The time threshold measures the driver needs to take in concrete terms to signal his desire to operate the clutch can be freely selected to a large extent. In particular, the driver can demand a suitably mutually coordinated operation both of the gas pedal 15 and of the selector lever 11 and, if desired, also of the clutching requirement signaling switch 33.

A few practical situations which are intended to ease comprehension of the invention are now explained:

1. Firstly, the case is considered in which the internal combustion engine 1 is switched off, a gear is engaged, the clutch 5 is closed and the power supply is switched on by the driver. The clutch 5 must be opened so that the vehicle can start to roll for the purpose of tow-starting, and/or for being towed away. This can be performed actively by the driver by signaling a desire to de-clutch to the control center 9 in the way outlined, for example by operating the selector lever 11 and/or the gas pedal 15 and/or the signaling switch 33. If the driver omits to exert this active influence, the control center 9 can automatically cause the clutch 5 to open when it determines a non-zero speed of the vehicle. For this purpose, the control center 9 can evaluate the signals of a transmission speed sensor 35 which detects the transmission input speed and/or of a wheel speed sensor 37 which detects the wheel speed of one of the driven wheels. For example, the control center 9 causes the clutch 5 to be de-clutched when these sensor signals indicate a vehicle speed of 1 or 2 km/h.

As soon as the clutch 5 is open, the vehicle can start to roll easily. The control center 9 holds the clutch 5 in its released state as long as the driver does not signal a desire to engage. If there is no such desire to engage, the vehicle can be towed away without risk. If, however, the driver intends to have the vehicle tow-started, he can actively cause the clutch 5 to be closed by signaling his desire to engage. This signaling can, in turn, be performed by the sole or combined operation of the gas pedal 15 and/or the selector lever 11 and/or the signaling switch 33. If desired, the engagement of the clutch 5 can additionally be made dependent on the fact that the transmission input speed measured by the transmission speed sensor 35 exceeds a predetermined transmission speed threshold value and/or that the wheel speed measured by the wheel speed sensor 37 exceeds a predetermined wheel speed threshold value. The respective threshold value expediently lies in the range in which the engine 1 starts up reliably, for example at approximately 150–200 rpm for the transmission input speed.

2. The next step is to consider the case in which the engine 1 is switched off, the power supply is switched on and a gear is engaged, but the clutch 5 is released. In this state, the vehicle can start to roll out of standstill on its own or by means of extraneous help. The subsequent operations can proceed analogously with the first case.

3. The third step is to consider the case in which the engine 1 is once again switched off, the power supply is switched on and the gearbox 3 is set into a neutral position in which there is no transmission of torque between the transmission input side and the transmission output side. Independently of whether the clutch 5 is engaged or released in this situation, the vehicle can then start to roll out of standstill on its own or by means of extraneous help. In the rolling state, a suitable gear can be selected and engaged by the driver by means of the selector lever 11. If the clutch 5 was previously closed, the control center 9 causes the clutch 5 to open—as soon as it detects the intention to engage a gear with the aid of the signal from the lever-position sensor 21. Since the engine 1 is not in combustion mode and is at a standstill, after the gear has been engaged, the control center 9 keeps the clutch 5 in the released state and does not supply the actuator 7 with an engaging control signal until the driver signals a desire to engage. The signaling of this desire to engage can be performed analogously as in the two cases above.

4. As the last case, a situation is considered in which the engine 1 fails as the vehicle is being driven, which can occur, for example, during a gear shift of the gearbox 3. If the clutch 5 is still engaged at the moment the engine 1 dies, the control center 9 causes the clutch 5 to open as soon as it detects the operational failure of the engine 1 with the aid of the sensor signal from the motor speed sensor 31. It is now conceivable as a possibility that the control center 9 keeps the clutch 5 open until the driver signals a desire to engage. It is conceivable as an alternative possibility that the control center 9 re-engages the clutch 5 automatically without active intervention from the driver, in order to start the engine 1. If the engine 1 has died during a gear shift of the gearbox 3, the control center 9 would wait with the clutch 5 engaged until the gear shift is completed. For safety reasons, such an automatic engagement of the clutch 5 without active intervention from the driver will be expediently allowed only when in addition to the precondition of an operating standstill of the engine 1, still further conditions are also fulfilled which reliably indicate that it is desired to start the engine 1 and there is no intention to tow away. Such a condition could, for example, be that the engine 1 was not in combustion mode only for a very short period, for example in the range of seconds or even shorter. Another condition could be that the instantaneous speed of the vehicle exceeds a predetermined threshold which is selected to be so high that it is beyond speeds which normally occur in the case of tow-starting or towing-away operations which take place starting from vehicle standstill. Such a threshold could, for example, be at approximately 50, 60 or 70 km/h or above. Various other conditions are conceivable. These conditions must, in any case, reliably indicate that the engine 1 has died in the driving mode of the vehicle, that restarting the engine 1 immediately is not harmful, and that there is absolutely no intention to tow away the vehicle from standstill.

The invention is not limited by the embodiments described above which are presented as examples only but can be modified in various ways within the scope of protection defined by the appended patent claims.

I claim:

1. An arrangement for operating a friction clutch in a mechanical drive train of a motor vehicle driven by an internal combustion engine comprising:

a clutch operator actuator enabling a clutch operator of the clutch to adjust the clutch between at least one engaged position where the clutch is engaged at least for partially transmitting a torque, and a de-clutched position in which the clutch is completely disengaged;

an electronic control device controlling said clutch operator actuator; and a clutching requirement signaling device coupled to said electronic control device and providing clutching requirement signals to said electronic control device, said clutching requirement signaling device capable of being operated by an operator;

wherein in response to a clutching requirement signal generated with the engine switched off and the clutch in a de-clutched position, said electronic control device supplies an engaging control signal to said clutch operator actuator for changing the clutch from the declutched position to the engaged position.

2. The arrangement for operating a friction clutch in accordance with claim 1, wherein said clutching requirement signaling device comprises:

an engine power setting device for controlling an amount of engine power being output; and a power-setting sensor coupled to said engine power setting device and said electronic control device for monitoring a position of said engine power setting device, said electronic control device determining the clutching requirement as a function of the position of said engine power setting device .

3. The arrangement for operating a friction clutch in accordance with claim 1, wherein said clutching requirement signaling device comprises:

a selector lever for an automatic gearbox connected downstream of the clutch in the drive train; and a lever-position sensor connected to said selector lever and said electronic control device and for detecting a position of said selector lever, said electronic control device determining the clutching requirement as a function of the position of said lever-position sensor.

4. The arrangement for operating a friction clutch in accordance with claim 1, wherein said clutching requirement signaling device comprises a separate operating member coupled to said electronic control device for solely providing clutching requirement signaling to said electronic control device.

5. The arrangement for operating a friction clutch in accordance with claim 1, further comprising a sensor system connected to said electronic control device and for supplying information on an output speed of the clutch, wherein when the engine is switched off and the clutch is de-clutched, said electronic control device generating an engaging control signal when the output speed exceeds a predetermined engaging speed threshold.

6. The arrangement for operating a friction clutch in accordance with claim 1, wherein said electronic control device generates an engaging control signal for said clutch operator actuator in the presence of at least one predetermined driving operating state of the motor vehicle and in the absence of the clutching requirement signal being signaled by the operator.

7. The arrangement for operating a friction clutch in accordance with claim 1, wherein said electronic control device supplies a de-clutching control signal to said clutch operator actuator in response to a clutching requirement signaled with the engine switched off and the clutch engaged, said de-clutching control signal changing the position of the clutch from the engaged position to the de-clutched position.

8. The arrangement for operating a friction clutch in accordance with claim 1, further comprising a sensor system connected to said electronic control device and for supplying information on an output speed of the clutch, wherein when the engine is switched off and the clutch is engaged, said electronic control device generating a de-clutching control signal when the output speed exceeds a predetermined de-clutching speed threshold, and in the absence of the clutching requirement being signaled by the operator.

9. The arrangement for operating a friction clutch in accordance with claim 2, wherein said engine power setting device comprises a gas pedal.

* * * * *